(12) United States Patent
Abe et al.

(10) Patent No.: US 6,478,339 B1
(45) Date of Patent: Nov. 12, 2002

(54) DISPLACEMENT ABSORBING PIPING JOINT

(75) Inventors: Yoichi Abe, Narita (JP); Shoichi Kameta, Narita (JP); Katsuhiko Hagiwara, Narita (JP); Shunji Kawabata, Narita (JP); Takafumi Oshima, Narita (JP)

(73) Assignee: New Tokyo International Airport Authority, Chiba (JP)

( * ) Notice: Subject to any disclaimer, the term of this patent is extended or adjusted under 35 U.S.C. 154(b) by 0 days.

(21) Appl. No.: 09/936,529

(22) PCT Filed: Jan. 12, 2001

(86) PCT No.: PCT/JP01/00117

§ 371 (c)(1),
(2), (4) Date: Dec. 5, 2001

(87) PCT Pub. No.: WO01/51842

PCT Pub. Date: Jul. 19, 2001

(30) Foreign Application Priority Data

Jan. 14, 2000 (JP) ........................................ 2000-007190

(51) Int. Cl.[7] .............................................. F16L 55/00
(52) U.S. Cl. ......................... 285/61; 285/223; 285/114; 52/220.3
(58) Field of Search .............................. 285/61, 64, 19, 285/223, 224, 114, 225, 148.27; 52/220.2, 220.3

(56) References Cited

U.S. PATENT DOCUMENTS

| | | | | |
|---|---|---|---|---|
| 1,632,042 A | * | 6/1927 | Price et al. ................. | 285/224 |
| 1,802,353 A | * | 4/1931 | Rousek et al. ............... | 285/224 |
| 2,442,103 A | * | 5/1948 | Thomas ................... | 285/148.27 |
| 2,656,201 A | * | 10/1953 | Swerdlow et al. ........... | 285/224 |
| 3,115,352 A | * | 12/1963 | Heerlein ................. | 285/148.27 |
| 3,344,601 A | * | 10/1967 | Mieczkowski .............. | 285/224 |
| 3,476,912 A | * | 11/1969 | Garrison ..................... | 52/220.2 |
| 4,008,734 A | * | 2/1977 | Shimono et al. ............ | 285/224 |
| 4,291,905 A | * | 9/1981 | Schrock ....................... | 285/224 |
| 4,781,405 A | * | 11/1988 | Peaster ........................ | 285/233 |

FOREIGN PATENT DOCUMENTS

FR 2242631 * 3/1975 ................. 285/224

* cited by examiner

Primary Examiner—Eric K. Nicholson
(74) Attorney, Agent, or Firm—Rosenthal & Osha L.L.P.

(57) ABSTRACT

A piping joint for preventing pipe members laid across the connection end faces of two adjacent structural elements from being damaged by changes in the relative positional relationship between the two adjacent structural elements due to the expansion and contraction caused by changes in the temperature or external stresses. The piping joint connects the end portions of the two pipe members laid in two structural elements whose connection end faces can displace relatively to each other, between the connection end faces to make the two pipe members communicate. It comprises a fixed unit (30) fixedly embedded into the connection end face of one of the structural elements and a movable unit (50) supported by the fixed unit so as to be movable along the connection end face. The pipe member in the structural element is connected to the fixed unit, and the pipe member in the other structural element is connected to the movable element. The two pipe members communicate in the fixed unit. The stresses applied to the pipe members due to the relative displacements of the connection end faces of the two structural elements are absorbed by the displacements of the movable unit to the fixed unit along the connection end face.

5 Claims, 9 Drawing Sheets

(a)

(a)

(b)

(a)

(b)

DISPLACEMENT ABSORBING PIPING JOINT

TECHNICAL FIELD

The present invention relates to a displacement absorption piping joint capable of eliminating a trouble which occurs if, for example, a plurality of concrete pavement slabs are arranged adjacent and opposite one another, i.e., a trouble that pipe members, a cable or the like arranged to penetrate between the connected end faces of the adjacent concrete pavement slabs are damaged as a result of the relative displacement of the positional relationship between the concrete pavement slabs caused by the expansion and contraction of the concrete pavement slabs due to temperature change, an external stress or the like.

BACKGROUND ART

A concrete structure such as the runway, taxiway or apron of an airport, a concrete structure such as a road or a large-scale concrete or asphaltic structure such as a building, is often constructed by connecting a plurality of structural elements such as pavement slabs each having a required shape or the like. Since a positional shift or a displacement tends to occur between the connected end faces of the adjacent structural elements such as pavement slabs or the like constituting the large-scale structure due to the expansion and contraction of the structural elements, an external stress or the like, measures have been taken to prevent the damage of internal piping and wiring resulting from the positional shift or the like.

When constructing an airport runway, for example, an operation for arranging a plurality of PC pavement slabs each having a width of 7.5 m, a length of 100 m and a predetermined thickness on a field foundation course portion (such as roadbed) to be adjacent one another is carried out. That is, a large-scale structure (or runway) having a plurality of pavement slabs arranged to be adjacent one another is completed by sequentially executing pavement slab manufacturing steps of arranging a rectangular form on the field foundation course portion, filling and then hardening a material such as concrete for each pavement slab.

Meanwhile, if wires such as cables are provided inside the runway, cable wiring protection pipes are provided (or embedded) in the respective pavement slabs in advance and the end portions of the pipes exposed to the connection end faces of the pavement slabs adjacent one another are communicated and connected with one another. Thereafter, cables are inserted into each pipe, thereby completing wiring.

FIG. 10(a) is a perspective cross-sectional view showing a state in which the pavement slabs constituting the runway are provided to be continuous to one another, and FIGS. 10(b) and 10(c) show a piping structure on the connected end faces of the pavement slabs. Rectangular pavement slabs 2, for example, are arranged on a foundation course portion 1 such as a roadbed to be adjacent one another. An embedded lighting unit 3, for example, is embedded in the upper surface of each pavement slab and a cable 5 for supplying electric power to each lighting unit 3 is inserted into a pipe member 4 embedded and provided in each pavement slab 2.

As the pipe member 4, a bellows-shaped flexible pipe member made of a metallic material such as stainless or a steel product is mainly employed since it is advantages in that a piping path can be arbitrarily selected. To couple the pipe members 4 to each other on the connection end faces 2a (joints) of the pavement slabs 2, the openings 4a on the end portions of the respective pipe members 4 exposed to the respective connection end faces 2a are directly coupled to each other.

As shown in FIG. 11, each pavement slab 2 is completed by filling concrete in the form 6 and hardening the concrete while the form 6 is being fixed to the upper surface of the foundation course portion 1. Before an operation for filling the concrete is carried out, the pipe members 4 and the base portions of the lightning units 3 are positioned at predetermined points, respectively.

Meanwhile, the flexible pipes 4 are slightly expansion-deformed mainly in axial direction in response to loads or stresses applied to the pavement slabs, thereby exhibiting a function of slightly absorbing the loads or the like and protecting the internal cable 5. However, on the connection end faces 2a shown in FIG. 10(b), the flexible pipes 4 are simply connected to each other. Owing to this, if the positions of the adjacent pavement slabs 2 are relatively shifted in the plane direction of the connection end faces indicated by arrows as shown in FIG. 10(c), then the positions of the openings 4a on the both end portions are shifted in the plane direction, with the result that a shearing force generated on the both connection end faces 2a is applied to the cable 5 in the pipes and the cable 5 tends to be broken.

Further, even if the flexible pipe members 4 are provided not by connecting the mutual end portions of the pipes 4 but by allowing mutual bellows portions to spread across the connection end faces 2a of the two pavement slabs, the flexible pipes and the internal cable tend to be cut off due to a shearing force generated by the relative movement of the two connection end faces 2a as in the case of FIG. 10.

Thus far, no joint having a function of protecting pipe members provided to spread across the connection end faces of two structural elements from being damaged by a shearing force or the like generated between the connection end faces, has been developed. Due to this, the pipe members spreading across the connection end faces as well as the cable tend to deteriorate in a relatively short period of time, thereby requiring frequent replacement operations. Further, conventionally, it has been only the method to repair deteriorated pipe members by excavating the joint portions of the pavement slabs and thereby partially exposing the piping elements. Since this repair method requires an operation accompanied by labor and cost, it has been demanded to improve this respect.

It is an object of the present invention to provide a displacement absorption piping joint capable of eliminating a trouble which occurs if a plurality of concrete pavement slabs, for example, are continuously arranged on a roadbed with the end faces of the slabs opposite one another so as to construct an airport runway, i.e., a trouble that pipe members, a cable or the like arranged to penetrate between the connected end faces of the adjacent concrete pavement slabs are damaged by a shearing force due to the relative displacement of the positional relationship between the concrete pavement slabs caused by the expansion and contraction of the pavement slabs due to temperature change or the like, an external stress such as a load or the like.

In particular, the piping joint of the present invention is applicable to a case of protecting pipe members provided to spread across two structural elements, which are not limited to concrete structural elements such as concrete pavements, or a wire such as a cable inserted into the pipe members from a searing force generated by the relative displacement of the structural elements.

It is still more another object of the present invention to provide a piping joint capable of largely securing the movement quantities of two pipe members corresponding to the displacement quantities of structural elements despite its compact shape.

DISCLOSURE OF THE INVENTION

To obtain the above objects, the present invention according to claim 1, wherein a displacement absorption piping joint communicating and connecting end portions of pipe members respectively embedded into two structural elements adjacent each other and having connection end faces displaced relatively to each other, with each other on the connection end faces of the both structural elements, wherein the piping joint has a fixed unit fixedly embedded into the connection end face of one of the structural elements while a front end face side of the fixed unit is being exposed, and a movable unit supported by the fixed unit to be displaceable along a plane direction of the connection end faces; the pipe member provided within the one structural element is communicated and connected with the fixed unit, and the other pipe member provided within the other structural element is communicated and connected with the movable unit, thereby holding the both pipe members in the fixed unit in a communicated state; and a stress applied to the both pipe members due to relative displacement of the connection end faces of the both structural elements in the plane direction is absorbed and removed by a displacement action of the movable unit displaced relatively to the fixed unit in the plane direction.

By thus constituting the piping joint, the respective pipe elements arranged to spread across the connection end faces of the two structural elements, which are displaced relatively to each other, can be displaced independently of each other to follow the displacement of the structural elements. It is, therefore, possible to effectively prevent the damage of the pipe members and the like resulting from the fact that the pipe members cannot flexibly follow the displacement of the structural elements. According to the present invention, for the purpose of realizing such a damage occurrence prevention structure, the fixed unit is embedded into one of the structural elements, the movable unit is supported by the other structural element and also the both units are connected to the respectively corresponding pipe members. It is, therefore, possible for the piping joint to exhibit an excellent advantage of preventing the deterioration of the pipe members despite its simple constitution.

According to claim 2 of the present invention, wherein the fixed unit has a hollow box type case having a pipe member connection portion detachably connecting the pipe members on a rear surface and having an open front surface, a surface plate fixed to a front surface of the case through a plate packing so as to close the open front surface of the case, and elongate holes formed to penetrate the flat packing and the surface plate, respectively; and in that the movable unit has a slide base arranged movably into the case closed by the flat packing along the plane direction and having a screw hole formed to penetrate the slide base so as to fix one end of a coupling pipe, a bearing-added elastic urging member arranged between the slide base and an inner bottom of the case so as to elastically press-contact the slide base with an inner surface of the flat packing, the coupling pipe having one end fixedly screwed with the screw hole of the slide base and the other end thereby penetrating the respective elongate holes and protruding forward, a sealing plate screwed with a screw portion on an outer periphery of the coupling pipe and thereby sealing the elongate hole formed in the surface plate, and a nut screwed with the outer periphery of the coupling pipe so as to fix the sealing plate.

By thus constituting the piping joint, it is possible for the piping joint to connect the pipe members embedded into the two adjacent structural elements, respectively, with one another on the connection end faces in a relatively movable manner, and it is possible to protect the pipe members and a wiring provided in the pipe members by displacing the respective pipe members to follow the displacement of the connection end faces of the both structural elements in the plane direction, despite its quite simple constitution.

According to claim 3 of the present invention, wherein the open front surface of the hollow box type case is closed by the surface plate through the flat packing, thereby forming a space between the surface plate and the inner bottom of the case, the space exhibiting an absorbing effect to prevent breakage when the movable unit is displaced relatively to the fixed unit if a wire is penetrated and provided in the coupling pipe from the pipe member connection portion of the case through the space.

By thus constituting the piping joint, the respective pipe elements embedded into the two adjacent structural elements, respectively, are communicated and connected with each other not by being directly coupled to each other by through the space. It is, therefore, possible to secure a large movable space in the space for a wire penetrated into and spread across the respective pipe members. The movable range of the wire provided in the respective pipe members is determined according to the relationship between the inside diameters of the pipe members and the outside diameter of the wire. According to the present invention, since the space exists between the end faces of the both pipe members and this space is located on the relative displacement plane of the connection end faces of the two structural elements, a large movable range is secured for the wire along the displacement plane of the connection end faces, whereby the wire is free from receiving a shearing force resulting from the displacement of the connection end face.

According to claim 4 of the invention, wherein the structural elements are applicable to connections of not only concrete pavement but also all types of structural elements.

The piping joint of the present invention is applicable to a plurality of structural elements having the connection end faces adjacent each other and displaced relatively to each other. If concrete pavement slabs are selected as these structural elements, pipe members and a wire provided to spread across two adjacent structures can be effectively protected from the damage resulting from the relative movement of the both structural elements in longitudinal, lateral and slant directions in concrete structures such as a runway, a taxiway and apron on an airport, a road or the like.

BEST MODE FOR CARRYING OUT THE INVENTION

Figure 1:
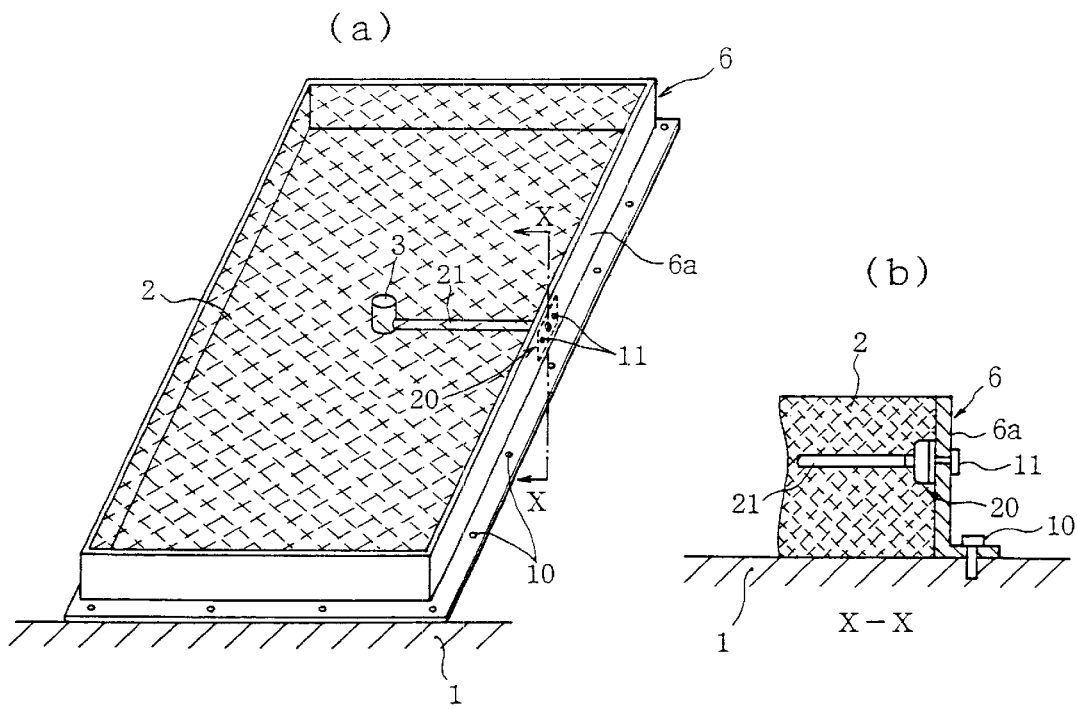
FIGS. 1(*a*) and 1(*b*) show manufacturing procedures for a pavement slab using the piping joint of the present invention and a sectional view of important parts, respectively.

Hereinafter, an embodiment of the present invention shown in the drawings will be described in more detail.

Before describing the structure of a displacement absorption piping joint according to the present invention in detail, description will be given to procedures for embedding the displacement absorption piping joints of the present invention into individual concrete pavement slabs and connecting pipe members embedded into the adjacent pavement slabs to the displacement absorption piping joints, with reference to FIGS. 1 and 2.

First, as shown in FIGS. 1(a) and 1(b), upon fixing the bottom portion of a form 6 having a flat shape of a rectangular frame onto a foundation course portion 1 such as a roadbed by bolts 10, a displacement absorption piping joint 20 according to the present invention is fixed to the inside of the side plate 6a of a side frame 6 covering the connection end face (joint) 2A with another adjacent pavement slab by bolts 11 or the like in advance and then a pipe member 21 is connected to the rear portion of the displacement absorption piping joint 20. The other end of the pipe member 21 is connected to the bottomed base of a lighting unit 3 embedded in the upper surface of the pavement slab. While the embedded member is positioned at a required position in the form 6 as stated above, concrete is filled and hardened in the frame 6, the bolts 11 are removed from the side plate 6a, the bolts 10 are removed from the bottom portion of the form and the form 6 is then removed from the foundation course portion 1, thereby completing the first pavement slab 2-1.

Figure 2:
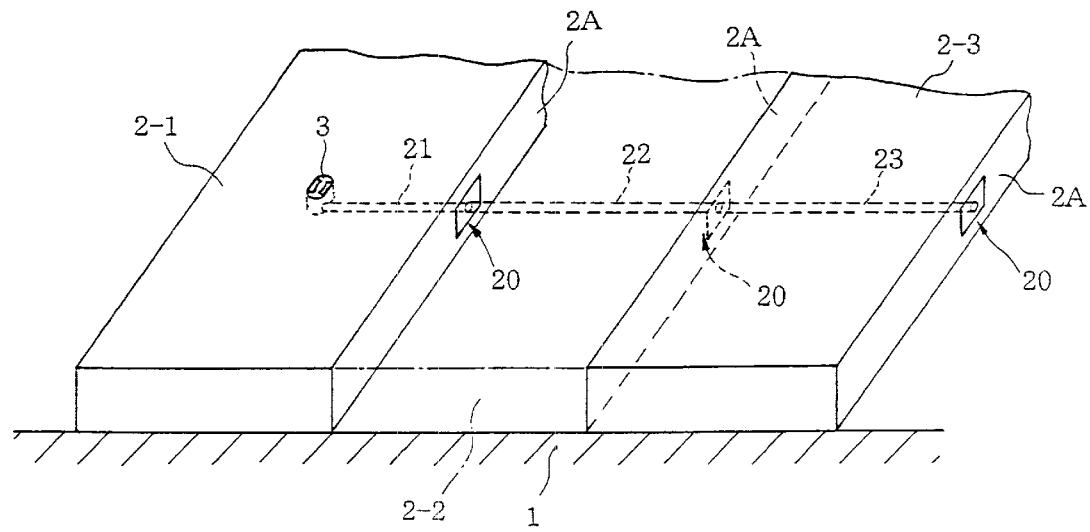
FIG. 2 is an explanatory view showing procedures for manufacturing pavement slabs.

Next, in FIG. 2, procedures for sequentially constructing the other pavement slabs after completing the first pavement slab 2 on the foundation course portion 1 are illustrated. After the completion of the first pavement slab 2-1, the third pavement slab 2-3 is constructed using a form prior to the construction of the second pavement slab 2-2 according to the same procedures as those described in FIG. 1. Then, procedures for constructing the second pavement slab 2-2 are carried out. During these procedures, the right connection end face of the first pavement slab 2-1 and the left connection end face of the third pavement slab 2-3 can be used instead of the longitudinal side plates 6a of the form. Due to this, only the front and rear surfaces on which no pavement slabs exist are closed by plates, not shown, and concrete is then filled into a space surrounded by the both pavement slabs 2-1 and 2-3 as well as the two plates, thereby constructing the second pavement slab 2-2. It is noted that before filling concrete to construct the second pavement slab, a pipe member 22 is provided in the space between the pavement slabs 2-1 and 2-3. At this moment, by connecting one end of the pipe member 22 with the outside of the displacement absorption piping joint 20 exposed to the right connection end face of the first pavement slab 2-1, the pipe member 22 is communicated and connected with the pipe member 21 within the first pavement slab 2-1. The other end of the pipe member 22 is connected with the front portion of the displacement absorption piping joint 20 fixed to the left connection end face of the third pavement slab 2-3. In this state, concrete is filled to thereby complete the second pavement slab 2-2.

It is noted that target structural elements to which the displacement absorption piping joints of the present invention are applied are not limited to concrete structures such as pavement slabs but the target structural elements involve structures made of all types of materials.

Figure 3:
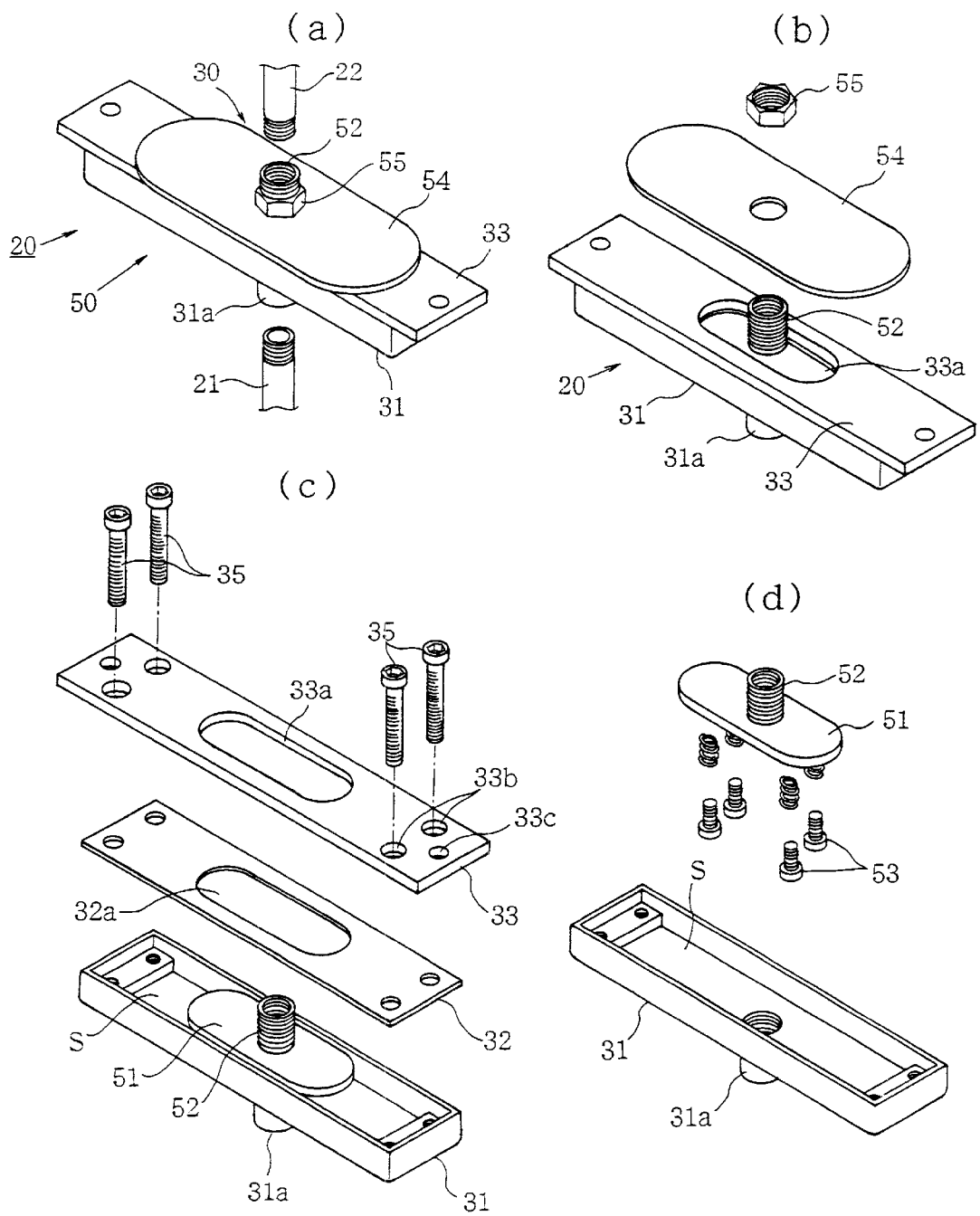
FIGS. 3(*a*) to 3(*d*) are perspective views showing one example of the piping joint of the present invention, i.e., perspective views showing state in which the piping joint is sequentially disassembled.

Next, the displacement absorption piping joint of the present invention will be described in detail based on FIG. 3 and the like.

Figure 4:
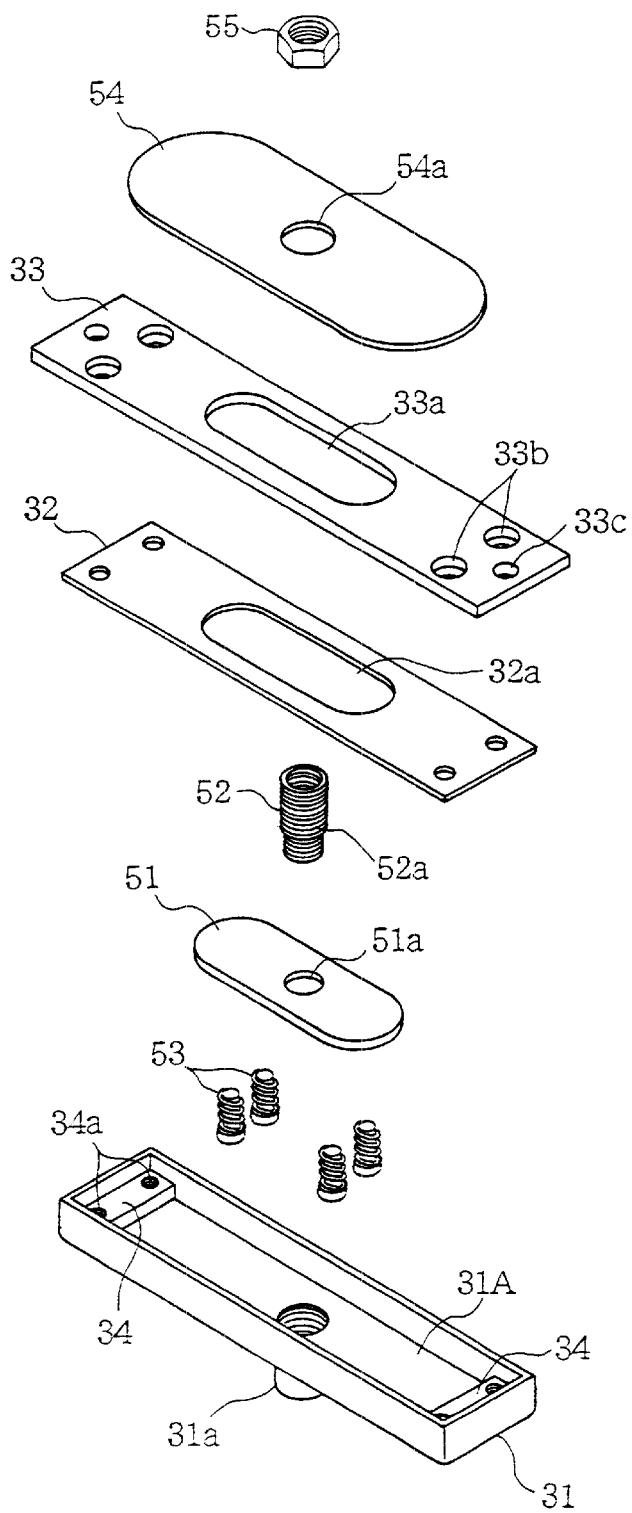
FIG. 4 is an exploded perspective view of the piping joint of the present invention.
Figure 5:
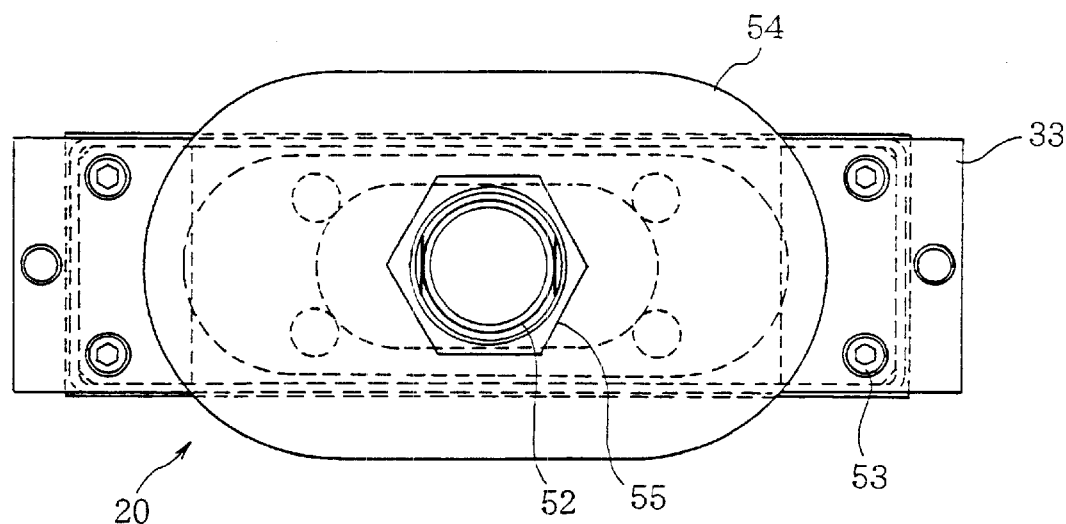
FIGS. 5(a) and 5(b) are a front view and a rear view of the piping joint of the present invention, respectively.
Figure 5:
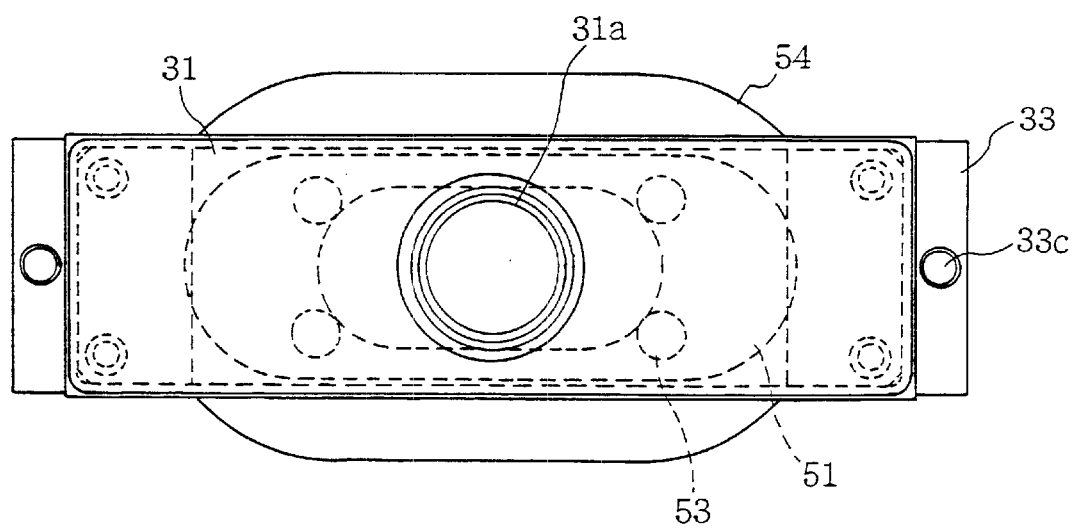
Figure 6:
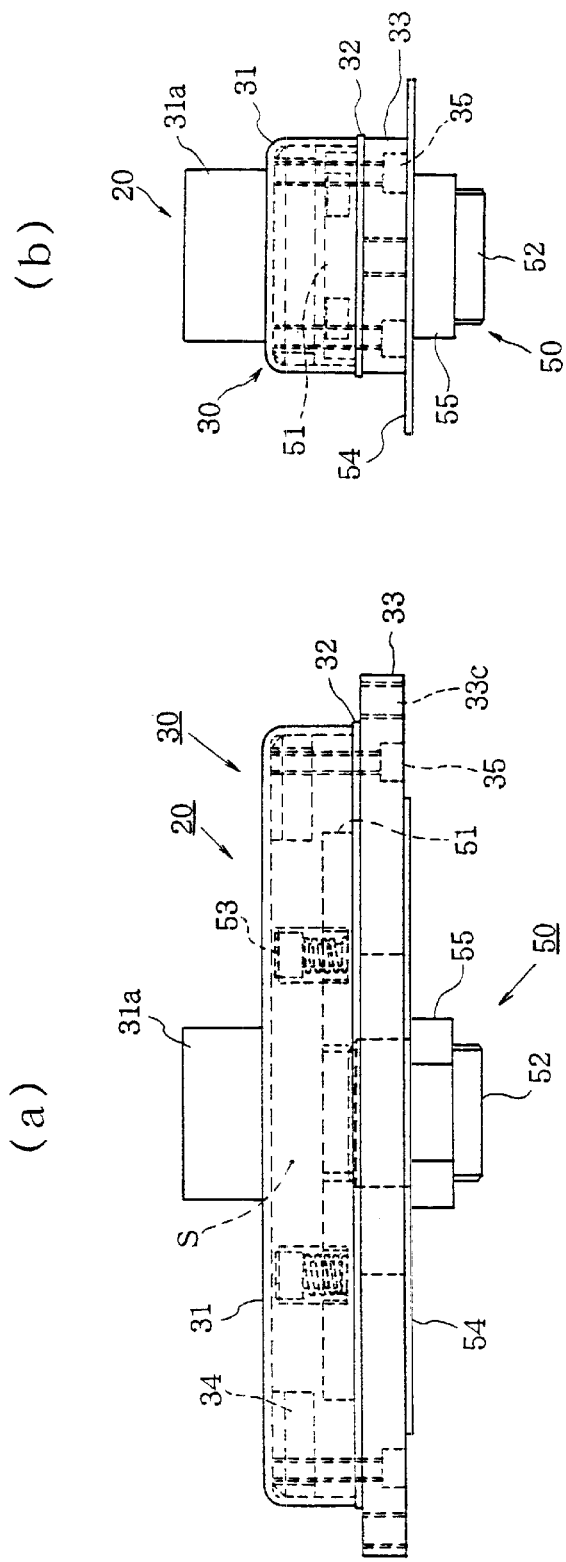
FIGS. 6(a) and 6(b) are an upper view and a right side view of the piping joint, respectively.
Figure 7:
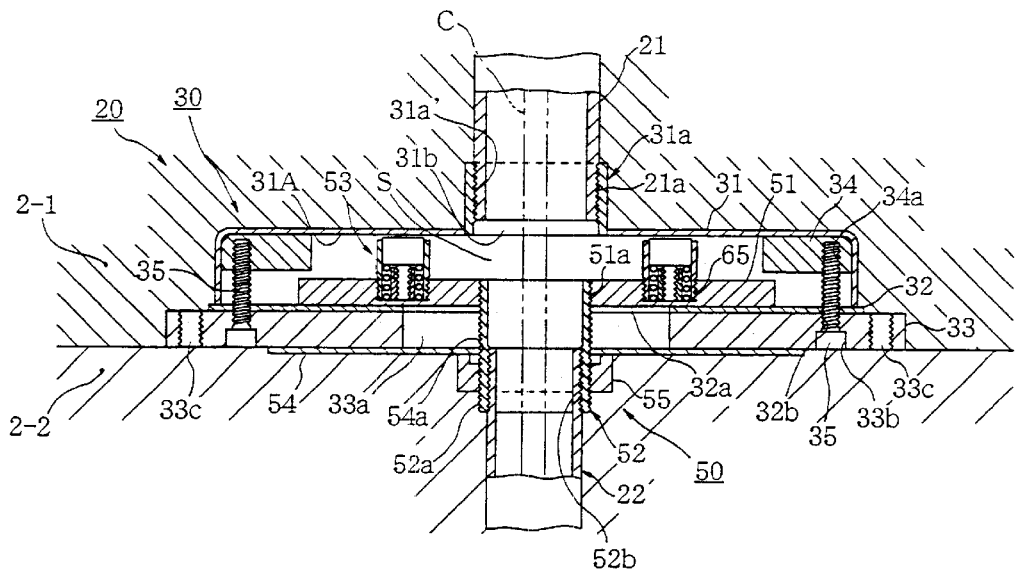
FIGS. 7(a) and 7(b) are longitudinal sectional views showing the upper surface of the piping joint, respectively.
Figure 7:
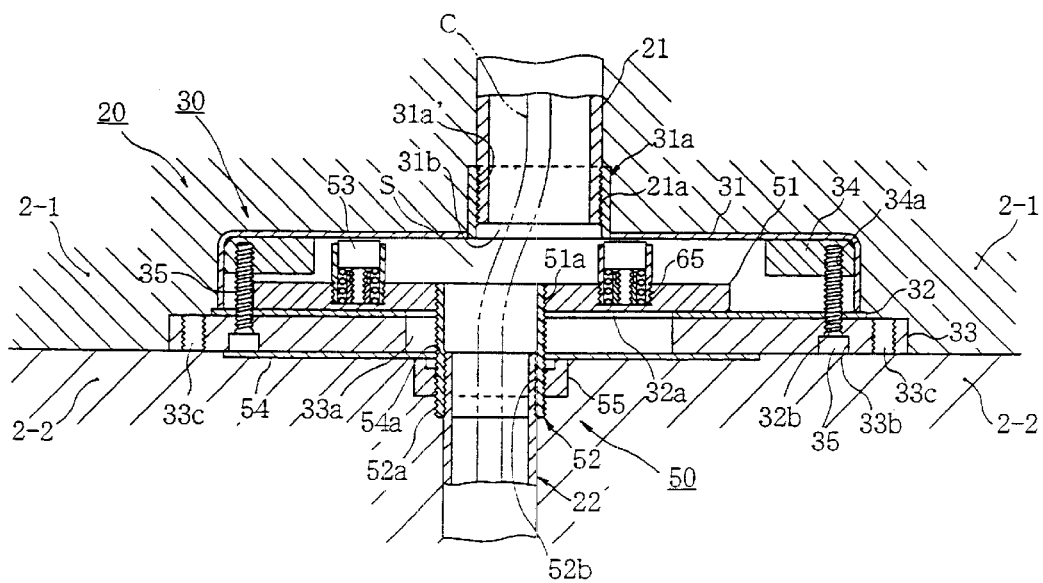

FIGS. 3(a) to 3(d) are perspective views showing one example of the piping joint of the present invention, i.e., perspective views showing states in which the piping joint is sequentially disassembled, respectively. FIG. 4 is an exploded perspective view of the piping joint of the present invention. Also, FIGS. 5(a) and 5(b) are a front view and a rear view of the piping joint of the present invention, respectively. FIGS. 6(a) and 6(b) are an upper view and a right side view of the piping joint, respectively. FIGS. 7(a) and 7(b) are longitudinal sectional views showing the upper surface of the piping joint, respectively.

The displacement absorption piping joint (to be referred to as "piping joint" hereinafter) 20 of the present invention is a means used if two adjacent structures, for example, concrete pavement slabs, are arranged on a foundation course portion 1 to be adjacent each other, which mean effectively prevents the occurrence of a trouble that pipe members, a cable or the like provided to penetrate the connection end faces of the both pavement slabs are cut off by a shearing force generated by the relative displacement of connection end faces of the both pavement slabs in plane direction. The schematic constitution of the piping joint is as follows.

Namely, this piping joint 20 has a fixed unit 30 fixedly embedded into the connection end face 2A of one pavement slab 2-1 in a state in which the front end face side of the fixed unit 30 is exposed to the connection end face 2A, and a movable unit 50 supported by the fixed unit 30 to be displaceable along the plane direction of the connection end face 2A. By connecting the rear portion of the fixed unit 30 (or the inside of the pavement slab 2-1) with the end portion of the pipe member 21 within the pavement slab 2-1 and connecting the movable unit 50 with the pipe member 22 within the second pavement slab 2-2, the both pipe members 21 and 22 can be flexibly displaced according to the displacement between the pavement slabs in the plane direction and it is, therefore, possible to prevent the pipe members and the cable provided in the pipe members from being cut off and damaged.

That is to say, this piping joint 20 is characterized by being constituted as follows. The pipe member 21 provided within one pavement slab 2-1 is communicated and connected with the fixed unit 30 and the other pipe member 22 provided within the other pavement slab 2-1 is communicated and connected with the movable unit 50, whereby the both pipe members 21 and 22 are held in the fixed unit 30 while being communicated with each other and stresses applied to the both pavement slabs by the relative displacement of the respective connection end faces of the two adjacent pavement slabs in the plane direction are absorbed and eliminated by the plane-direction displacement action of the movable unit 50 displaced relatively to the fixed unit 30.

Next, the detailed constitution of the piping joint 20 will be described.

First, the fixed unit 30 has a pipe member connection portion 31a provided on a rear surface and detachably connecting one end of the pipe member 21, a hollow box type case 31 having an open front surface, a surface plate 33 fixed to the front surface of the case through a flat packing 32 so as to close the open front surface of the case 31, and elongate holes 32a and 33a of elongate circle, elliptical shape or the like formed to penetrate the flat packing 32 and the surface plate 33, respectively. Also, fixed nuts 34 each having female screw holes 34a are fixed to the longitudinal both end portions of the interior of the case 31, respectively. The male screw portions of bolts 35 inserted from holes 32b and 33b provided in the flat packing 32 and the surface plate 33, respectively, are screwed with the female screw holes 34a of the fixed nuts 34, whereby the flat packing 32 and the surface plate 33 are fixed to the front surface of the case 31 and the front surface opening of the case is closed.

It is noted that the cylindrical pipe member connection portion 31a may be constituted to be detachably screwed with a hole 31b formed in the rear surface of the case 31. A screw portion 31a' is formed in the inner or outer surface of the pipe member connection portion 31a and the screw portion 21a of the pipe member 21. is screwed and coupled with the screw portion 31a'.

The longitudinal end portions of the surface plate 33 protrude with respect to the end portions of the case 31, and fixed holes 33c are formed in the protruding portions. The fixed holes 33c are provided to insert the bolts 11, shown in FIG. 1, into the holes 33c and to fix the bolts 11 to the side surfaces of the form. The fixed holes 33c are used to fix the piping joint 20 to the side surface of the form.

A thin plate such as a Teflon (trademark) plate having a low friction resistance is used as the flat packing 32. This flat packing 32 is a means for ensuring the airtightness and watertightness between the edges of the front surface opening side of the case 31 and the surface plate 33 and also functions to smoothly move a slide base to be described later. It is noted that all the components other than the flat packing 32 are made of metallic materials each having sufficient stiffness.

It is noted that since the shapes, sizes and the like of the constituent elements including the case 31 constituting the fixed portion can be varied according to the shape, size and the like of the pavement slabs to be applied, the illustrated example is only one example. This is true for the movable portion to be described later.

Next, the movable unit 50 has a slide base 51 which is movably arranged in a space in the case 31 having the front surface opening closed by the flat packing 32 along the plane direction and which has a screw hole 51a formed to penetrate the slide base 51 so as to fix one end of a coupling pipe 52, bearing-added elastic urging members 53 arranged between the slide base 51 and the inner-bottom 31A of the case. so as to elastically press-contact the slide base 51 with the inner surface of the flat packing 32, the coupling pipe 52 having one end fixedly screwed with the screw hole 51a of the slide base 51 and the other end thereby penetrating the respective elongate holes 32a and 33a and protruding forward, a sealing plate 54 screwed with the screw portion 52a on the outer periphery of the coupling pipe and thereby sealing the elongate hole 33a formed in the surface plate 33, and a nut 55 screwed with the outer periphery of the coupling pipe to so as to fix the sealing plate 54. In addition, one end of the pipe member 22 is coupled to a screw portion 52b formed on the inner periphery of the coupling pipe 52.

As a result, the pipe members 21 and 22 are communicated with each other through the hollow interior (or the interior of the space S) of the fixed unit 30 and the coupling pipe 52 of the movable unit 50 and an airtight communication passage is thereby formed. A cable C clan be inserted into this airtight communication passage. The cable C passes through the space S having large longitudinal and lateral widths located between the two narrow diameter pipe members 21 and 22, thereby greatly decreasing the probability of damaging the cable due to the positional shift between the pipe members 21 and 22 when the two adjacent pavement slabs 2-1 and 2-2 are displaced relatively to each other.

Each pipe member may be an ordinary pipe having a rigid constitution or may be a flexible joint pipe.

The movable unit 50 can be moved relatively to the fixed unit 30 in a range in which the coupling pipe 52 integrated with the slide base 51 is movable longitudinally and laterally in the opening spaces of the elongate holes 32a and 33a.

The bearing-added elastic urging members 53 help the adhesion between the slide base 51 and the plate packing 32 and enhance airtightness by the flat packing by constantly press-contacting the slide base 51 to the inner surface of the flat packing 32.

Figure 8:
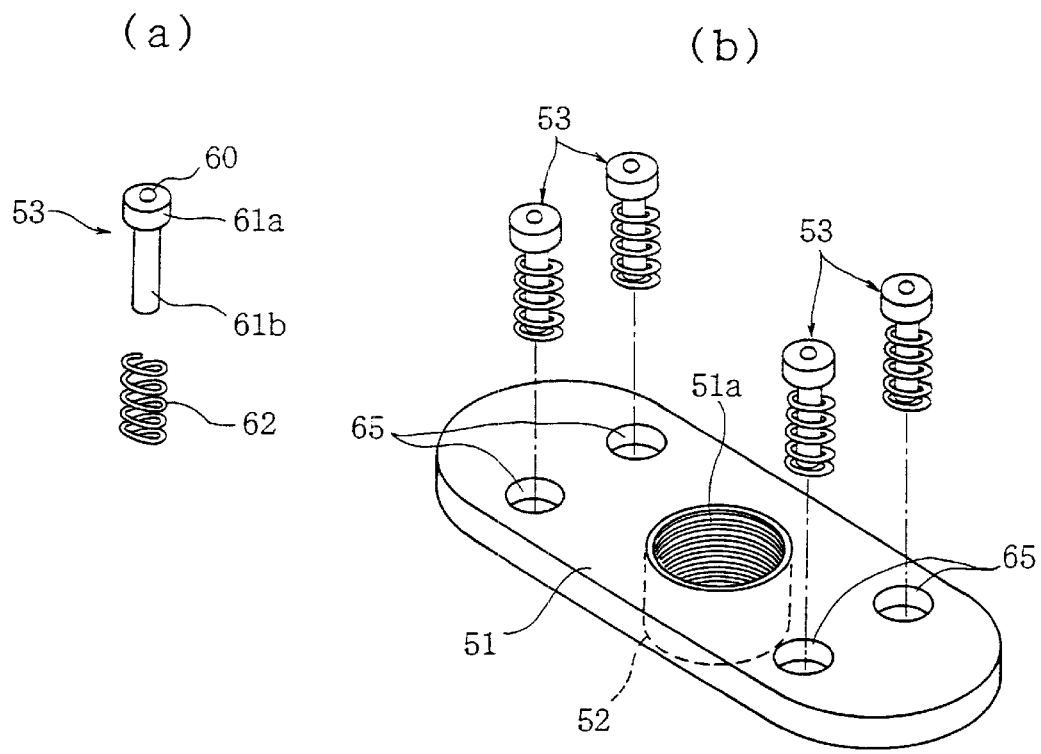
FIGS. 8(a) and 8(b) are explanatory view for the constitution of elastic urging members.

As shown in FIG. 8(a), each of the bearing-added elastic urging members 53 has a main body consisting of a support portion 61a supporting a ball bearing 60 partially protruding in a concave portion provided in the tip end surface of the member 53 so that the ball bearing 60 can freely roll and a shaft portion 61b protruding from the bottom of the support portion 61a, and a coil spring 62 fitted into the outer periphery of the shaft portion 61b and axially urging the main body. As shown in FIG. 8(b), this bearing-added elastic urging member 53 is constituted to urge the support portion 61a toward the inner bottom of the case 31 using the coil spring 62 by fitting the shaft portion 61b into each concave portion 65 formed in the bottom of the slide base 51. By allowing the bearing 60 to roll along the inner bottom 31A of the case, the smooth operation of the movable unit 50 in the plane direction is ensured. It is noted that a cylindrical support member, not shown, instead of the concave portions 65 may be provided on the bottom of the slide base 51 and the shaft portion 61b may be fitted into this support member.

The sealing plate, 54 is a metallic thin plate made of stainless or the like. The sealing plate 54 has a female screw hole 54a screwed with the screw portion 52a on the outer peripheral surface of the coupling pipe 52. In addition, the sealing plate 54 is set to have a wide area and a shape so as to be capable of continuously sealing the elongate hole 33a even if the movable unit 50 is displaced relatively to the fixed unit 30. As a result, it is possible to ensure preventing rainwater, dust or the like from entering the space S in the piping joint.

Figure 9:
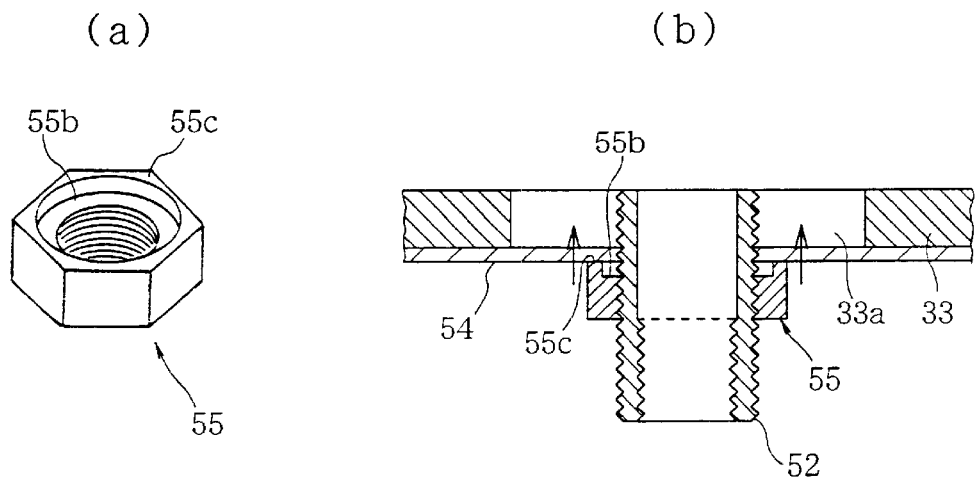
FIGS. 9(a) and 9(b) are explanatory view for the constitution of a nut.
Figure 10A:
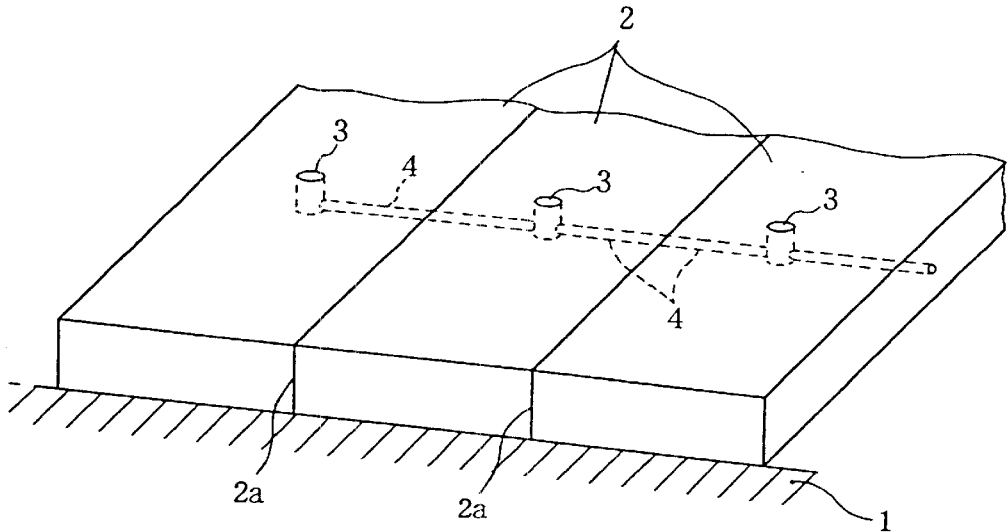
FIG. 10(a) is a perspective cross-sectional view showing a state in which pavement slabs constituting a runway are provided continuously.
Figure 10B:
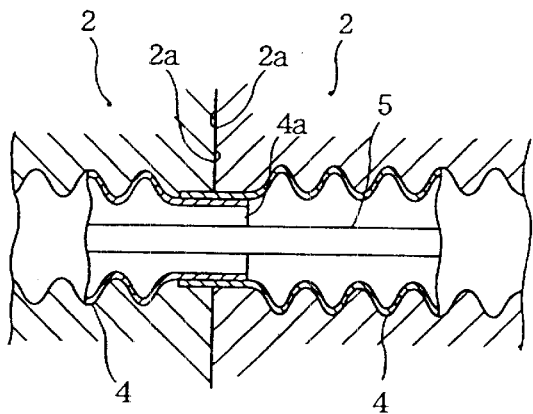
FIGS. 10(b) and 10(c) show a piping structure on the connection end faces of the pavement slabs.
Figure 10C:
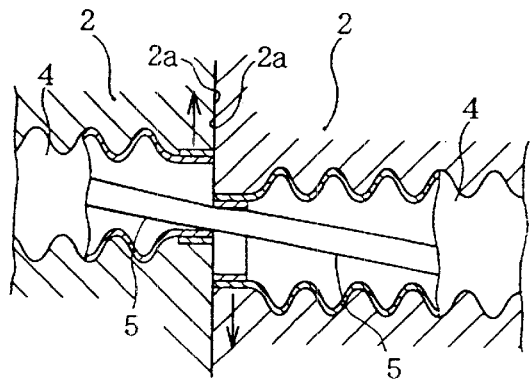
Figure 11:
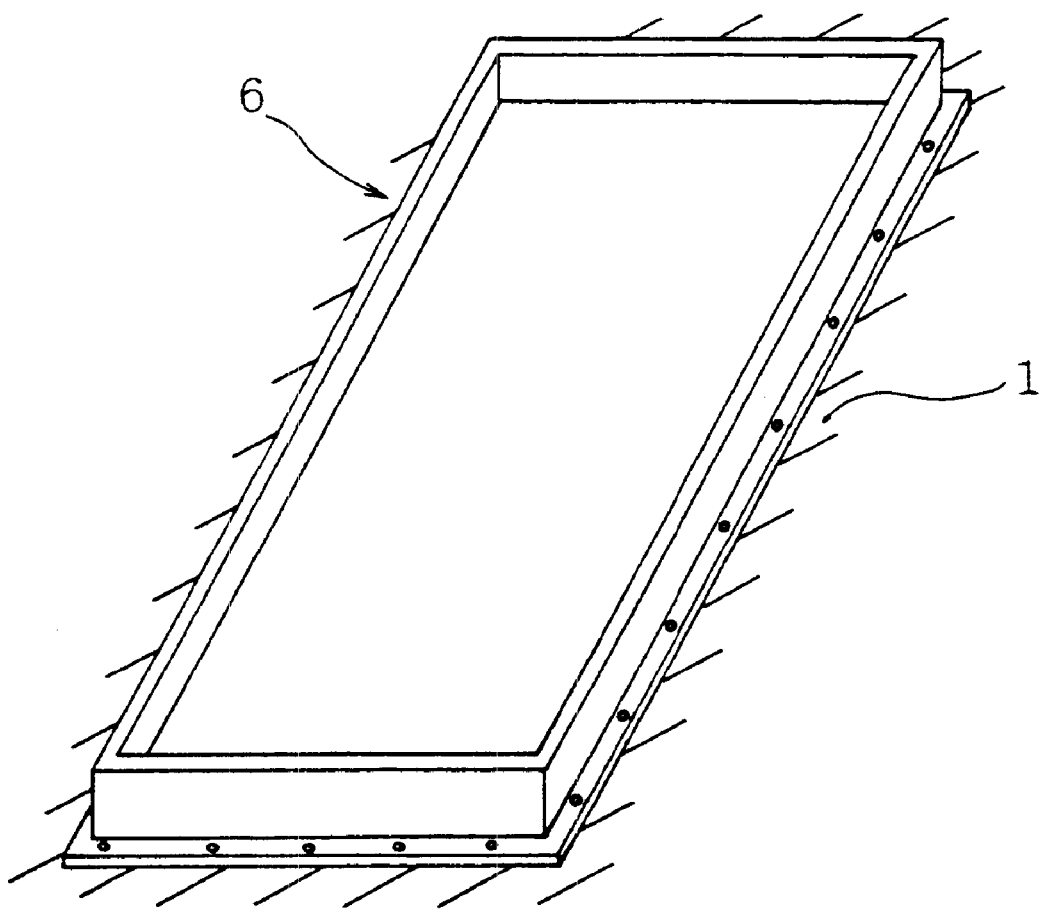
FIG. 11 is a constitution diagram of a form used to construct a pavement slab.

As shown in FIGS. 9(a) and 9(b), the nut 55 has a female screw portion 55a on the inner diameter thereof. By assembling the female screw portion 55a to be screwed with the screw potion 52a on the outer periphery of the coupling pipe, the sealing plate 54 can be rigidly fixed to the coupling pipe 52 by a double nut principle. The sealing plate 54 is fixedly screwed with the coupling pipe manually, thereby facilitating field operations (works).

In addition, since the nut 55 has a step 55b on a side in contact with the sealing plate 54, the contact end face 55c is made thin. Due to this, when the thin end face 55c is press-contacted with the sealing plate 54, the thin end face 55c has an urging force for urging the sealing plate 54 in a direction indicated by arrows. That is to say, the edges of the sealing plate 54 are always urged in the direction in which the sealing plate 54 is press-contacted with the surface plate 33. Accordingly, even if some external force is exerted to deform the sealing plate 54 in the direction in which the edges of the sealing plate 54 are separated from the surface plate 33, the trouble of the intrusion of dust resulting from the separation and deformation of the end portions of the sealing plate can be eliminated. This is because pressure from the nut 55 intensifies the force of the sealing plate 54 to continuously, fixedly adhere to the surface plate 33. It is noted that even if that the end portions of the sealing plate are separated from the surface plate 33, the separation distance is in the order of micrometers and the pressing force applied from the nut 55 effectively functions to prevent separation.

Further, a gasket is interposed between the coupling pipe 52 and the other member or the slide base 51, in particular, thereby ensuring sufficient airtightness and watertightness.

Moreover, an airtight treatment such as the application of an airtight seal agent is conducted to the portion on which the pipe 21 is connected to the connection pipe member 31a and the portion on which the pipe member is fastened to the coupling pipe 52 according to an ordinary method.

In accordance with the procedures which have been described with reference to FIGS. 1 and 2, the piping joint 20 is fixed to the inside of the side plate 6a of the form 6 used to manufacture the pavement slab 2-1, concrete is filled in the form 6 while the end portion of the pipe member 21 extending from the lightning unit 3 positioned in the form 6 is connected to the pipe member connection portion 31a of the case 31, the bolts 11 and the like are released after hardening the concrete and the form is removed, there by completing the first pavement slab 2-1. At this moment, only the fixed unit 30 and part of the movable unit 50 (i.e., the slide base 51 and the elastic urging members 53) are fixed to the pavement slab 2-1. Owing to this, the coupling pipe 52, the sealing plate 54 and the nut 55, which are the remaining components constituting the movable unit 50, are attached when the second pavement slab 2-2 adjacent the first pavement slab 2-1 is manufactured. In other words, the sealing plate 54 and the nut 55 are sequentially, fixedly screwed with the coupling pipe 52 exposed to the connection end face of the first pavement slab 2-1 thus completed and the pipe member 22 is coupled to the other end portion of the coupling pipe 52. Thereafter, concrete is filled in a space formed by the connection end faces of the first and third pavement slabs 2-1 and 2-3 and the front and rear plates, not shown, thus manufacturing the second pavement slab.

The third pavement slab 2-3 is already completed prior to the second pavement slab and the piping joint 20 of the present invention are fixed to the both connection end faces 2A of the third pavement slab 2-3, respectively. Due to this, the pipe member 22 embedded in the second pavement slab 2-2 is coupled to the piping joint 20 fixed to the third pavement slab 2-3 before filling concrete and then the concrete is filled, whereby the connection of the pipe members 21 and 23 in the first and third pavement slabs with the pipe member 22 in the second pavement slab 2-2 is completed.

Next, while the fixed unit 30 of the piping joint 20 fixed to the pavement slab 2-1 is fixedly communicated with the end portion of the pipe-member 21 within the pavement slab 2-1 integrally with each other, the movable unit 50 supported by the fixed unit 30 so as to be movable in the plane direction of the connection end face is fixed to the end portion of the pipe member 22 within the second pavement slab 2-2 adjacent the first pavement slab 2-1 in a communicated state. Due to this, even if the two adjacent pavement slabs 2-1 and 2-2 are relatively moved longitudinally and laterally along the plane direction of the connection end faces, both the fixed units 30 and the movable units 50 can be freely deplaced according to the movement. A range, in which the movable unit 50 can be deplaced with respect to the fixed unit 30 in the plane direction, is determined according to the relationship between the diameter of the coupling pipe 52 and the diameters of the elongate holes 32a and 33a. By presetting this movable unit deplacable range to conform to the normally expected deplacement quantity between the pavement slabs, it is impossible to prevent the cable inserted into the pipe members from being broken.

That is to say, the cable inserted into the pipe member connection portion 31a and the coupling pipe 52 is broken by a shearing force generated between the end portions of the both pipe member connection portion 31a and the coupling pipe 52 when the relative positional relationship between the pipe member connection portion 31a on the fixed unit 30 side and the coupling pipe 52 on the movable unit 50 side is shifted from a coaxial state as shown in FIG. 7(a) laterally or longitudinally as shown in FIG. 7(b). According to the present invention, since the sufficient space S exists between the inner bottom 31A of the case 31 and the slide base 51, the above-described shearing force is not generated. Particularly, by largely securing the respective inside diameters of the pipe member connection portion 31a and the coupling pipe 52 relative to the diameter of the cable and largely securing the movable range of the movable unit 50 relative to the fixed unit 30 in advance, the probability that the cable is broken by the normally expected positional shift between the pavement slabs is eliminated.

In other words, according to the present invention, the pipe members 21 and 22 embedded in the two adjacent structural elements, i.e., the two pavement slabs, respectively, are not directly coupled on their end portions but communicated and connected with each other through the space S. Thus, a large movable space in the space S can be secured for the wire C inserted into and spread across the respective pipe members. The movable range of the wire provided in the respective pipe members is determined according to the relationship between the inside diameters of the respective pipes and the outside diameter of the wire. According to the present invention, since the space S exists between the end faces of the both pipe members and the space S is located in the vicinity of the relative displacement plane of the connection end faces of the two pavement slabs, a large movable range is secured for the wire along the displacement plane between the connection end faces, thereby making it difficult to apply a shearing force derived from the displacement of the connection end faces to the wire.

Pavement slabs used to construct a runway or the like are normally as long as about several tens to several hundred meters. For that reason, there are large expansion and contraction quantities of the pavement slabs resulting from temperature change or the like. However, by employing the piping joints of the present invention, it is possible to effectively prevent the pipe members from being damaged resulting from the displacement of the pavement slabs. If a wire such as a cable is provided in the pipe members, the wire is protected, as well.

Although the description which has been given to the above-described embodiment for carrying out the invention mainly relates to concrete pavement slabs, it is merely one example. The piping joint of the present invention is applicable widely to a means for preventing the occurrence of a trouble that pipe members located on connection end faces are damaged by a shearing force or the like because of the relative displacement of structural elements if a plurality of structures made of any arbitrary material are arranged to be adjacent one another and pipe members are arranged to penetrate between the connection end faces of the structural elements. Accordingly, the present invention is applicable not only to a case of providing a wire such as a cable in pipe members but also to a case of protecting the pipe members for transporting liquid, gas or the like themselves.

Moreover, in the above embodiment of the present invention, description has been given to a case where the two connection end faces of the two structural elements are almost perpendicular to each other. However, this description is only one example. Accordingly, even if two connection end faces are horizontal or slant, it is possible to apply the piping joints of the present invention and to solve a trouble derived from the relative displacement of the both end faces.

Furthermore, the connection end faces are not necessarily flat. The present invention effectively functions as a means for preventing the damage or the like which the pipe members or the like penetrating the both end faces sustain as a result of the relative displacement of the two non-flat end faces opposite each other.

As described above, according to the present invention, if the end faces of a plurality of concrete pavement slabs are faced each other and arranged on a roadbed continuously so as to construct a concrete structure such as a runway, a road or the like on an airport, it is possible to eliminate a trouble that pipe members, a cable and the like arranged to penetrate among the connection end faces of the adjacent concrete pavement slabs is damaged by a shearing force generated by the relative displacement of the positional relationship between the concrete pavement slabs caused by the expansion and contraction of the pavement slabs due to temperature change or the like, an external stress such as a load or the like.

Additionally, the piping joints of the present invention can be applied to a case of protecting not only concrete structural elements such as concrete pavement slabs but generally pipe members provided to spread across two structural elements or a wire such as a cable inserted into the pipe members from a shearing force generated by the relative displacement of the structural elements.

Further, since the piping joints of the present invention can ensure the large movable quantities of two pipe members corresponding to the displacement quantities of structural elements despite its compact shape, it is possible to ensure protecting the pipe members, the wire and the like serving as protection targets.

In addition, the sizes and shapes of the piping joints can be changed variously according to the sizes of structural elements. Due to this, the pipe joint is applicable to all types of structural elements and capable of effectively protecting pipe members, a wire or the like serving as protection targets from a stress resulting from the displacement of the structural elements or a shearing force, in particular.

What is claimed is:

1. A displacement absorption piping joint for connecting two separate pipes that are embedded in first and second adjacent structural elements, the joint comprising:

a fixed unit embedded in the first adjacent structural element, the fixed unit having a through-hole for connecting a pipe embedded in the first adjacent structural element to the fixed unit; and a movable unit embedded in the second adjacent structural element and slidably mounted on the fixed unit, the movable unit having a through-hole for connecting a pipe embedded in the second structural element to the movable unit;

wherein, upon relative displacement of the pipes embedded in the first and second adjacent structural elements, the movable unit is slid along the fixed unit such that connection between the pipe embedded in the first adjacent structural element and the pipe embedded in the second structural element is maintained within the joint.

2. The joint according to claim 1, wherein the fixed unit is formed in a rectangular shape having a cavity with a closed bottom and an opened top, and the movable unit is mounted on the fixed unit in a manner that the movable unit is slidable inside the cavity of the rectangular shape by a predetermined distance in a longitudinal direction thereof.

3. The joint according to claim 2, wherein the through-hole of the fixed unit is separated from the through-hole of the movable unit by a predetermined distance such that upon relative displacement of the first and second adjacent structural elements, connection between the pipe connected to the through-hole of the fixed unit and the pipe connected to the through-hole of the movable unit is maintained through a space formed within the predetermined distance.

4. The joint according to claim 1, wherein the through-hole of the fixed unit is separated from the through-hole of the movable unit by a predetermined distance such that, upon relative displacement of the first and second adjacent structural elements, connection between the pipe connected to the through-hole of the fixed unit and the pipe connected to the through-hole of the movable unit is maintained through a space formed within the predetermined distance.

5. The joint according to claim 2, wherein, upon relative displacement of the first and second adjacent structural elements, the movable unit is prevented from sliding along the fixed unit beyond the predetermined distance within the joint so that relative displacement of the pipes embedded in the first and second adjacent structural elements is prevented beyond the predetermined distance.

* * * * *

UNITED STATES PATENT AND TRADEMARK OFFICE
CERTIFICATE OF CORRECTION

PATENT NO. : 6,478,339 B1
DATED : November 12, 2002
INVENTOR(S) : Yoichi Abe et al.

It is certified that error appears in the above-identified patent and that said Letters Patent is hereby corrected as shown below:

<u>Title page,</u>
Item [54], please correct the title from "DISPLACEMENT ABSORBING PIPING JOINT" to -- DISPLACEMENT ABSORPTION PIPING JOINT --

Signed and Sealed this

First Day of April, 2003

JAMES E. ROGAN
*Director of the United States Patent and Trademark Office*